(12) United States Patent
Eltayeb et al.

(10) Patent No.: US 11,320,796 B1
(45) Date of Patent: May 3, 2022

(54) RENEWABLE ENERGY SYSTEM CONTROLS

(71) Applicant: Form Energy, Inc., Sommerville, MA (US)

(72) Inventors: Aly Eldeen O. Eltayeb, Boston, MA (US); Benjamin Michael Jenkins, Durham, NH (US); Marco Ferrara, Boston, MA (US)

(73) Assignee: Form Energy, Inc., Somerville, MA (US)

( * ) Notice: Subject to any disclaimer, the term of this patent is extended or adjusted under 35 U.S.C. 154(b) by 147 days.

(21) Appl. No.: 16/893,158

(22) Filed: Jun. 4, 2020

Related U.S. Application Data

(60) Provisional application No. 62/857,421, filed on Jun. 5, 2019.

(51) Int. Cl.
| | |
|---|---|
| *G05B 19/04* | (2006.01) |
| *G06Q 30/02* | (2012.01) |
| *G06Q 50/06* | (2012.01) |
| *G06Q 40/04* | (2012.01) |
| *G05B 19/042* | (2006.01) |

(52) U.S. Cl.
CPC ....... *G05B 19/042* (2013.01); *G06Q 30/0206* (2013.01); *G06Q 50/06* (2013.01); *G05B 2219/2619* (2013.01); *G06Q 40/04* (2013.01)

(58) Field of Classification Search
None
See application file for complete search history.

(56) References Cited

U.S. PATENT DOCUMENTS

| | | |
|---|---|---|
| 8,019,697 B2 | 9/2011 | Ozog |
| 9,799,084 B2 | 10/2017 | Forbes, Jr. |
| 10,277,034 B2 | 4/2019 | Marhoefer |

(Continued)

FOREIGN PATENT DOCUMENTS

CN 107464010 A 12/2017

OTHER PUBLICATIONS

Mills et al., "From volatility to value: analysing and managing financial and performance risk in energy savings projects", Oct. 2004, Energy Policy 34 (2006) 188 199. (Year: 2004).*

(Continued)

*Primary Examiner* — Mohammad Ali
*Assistant Examiner* — Kelvin Booker
(74) *Attorney, Agent, or Firm* — Clocktower Law; Erik J. Heels; Michael A. Bartley

(57) ABSTRACT

Physical and/or financial instruments may optimally hedge the cash flow of one or more renewable energy generators based on a desired risk and return profile of renewable infrastructure investors. Baseline revenues may be determined based on forward-looking electricity market price scenarios corresponding to qualified market products intended for sale from the renewable energy generators. Risk and return metrics of cash flows of the renewable energy generators may be determined. At least one physical hedge and/or financial hedge may be added. The size and operation of the renewable energy generators along with any physical hedges, or financial hedges, or both physical and financial hedges, may be optimized across multiple market price scenarios of qualified market products to optimize investor-tailored risk and return utility functions.

22 Claims, 8 Drawing Sheets

(56) References Cited

U.S. PATENT DOCUMENTS

| | | | |
|---|---|---|---|
| 2008/0228553 A1 | 9/2008 | Bryson et al. | |
| 2010/0179704 A1* | 7/2010 | Ozog | H02J 13/0006 700/291 |
| 2010/0217550 A1* | 8/2010 | Crabtree | H02J 13/00034 702/62 |
| 2010/0218108 A1* | 8/2010 | Crabtree | G06Q 50/06 715/738 |
| 2010/0332373 A1* | 12/2010 | Crabtree | G06Q 40/04 705/37 |
| 2011/0040666 A1* | 2/2011 | Crabtree | G06Q 50/06 705/37 |
| 2011/0231028 A1* | 9/2011 | Ozog | G06Q 50/06 700/291 |
| 2012/0065805 A1* | 3/2012 | Montalvo | H02J 3/144 700/297 |
| 2012/0144828 A1* | 6/2012 | Lazaris | H02J 3/381 60/641.1 |
| 2012/0150361 A1* | 6/2012 | Lazaris | H02J 3/004 700/297 |
| 2012/0150679 A1* | 6/2012 | Lazaris | H02J 3/14 705/26.2 |
| 2013/0054863 A1* | 2/2013 | Imes | H04L 47/70 710/304 |
| 2013/0218548 A1* | 8/2013 | Lazaris | H02J 3/14 703/18 |
| 2013/0332327 A1* | 12/2013 | Sgouridis | G06Q 40/04 705/37 |
| 2014/0188689 A1* | 7/2014 | Kalsi | H02J 3/008 705/37 |
| 2015/0094968 A1* | 4/2015 | Jia | G01R 21/133 702/60 |
| 2015/0276253 A1* | 10/2015 | Montalvo | H04L 12/12 700/276 |
| 2015/0317589 A1 | 11/2015 | Anderson et al. | |
| 2017/0228834 A1 | 8/2017 | Hoff | |
| 2017/0300019 A1* | 10/2017 | Blackhall | G05B 13/041 |

OTHER PUBLICATIONS

Mahani et al., "Network-aware approach for energy storage planning and control in the network with high penetration of renewables", Dec. 2016, Applied Energy 195 (2017) 974-990. (Year: 2016).*

Lund et al., "Review of energy system flexibility measures to enable high levels of variable renewable electricity", Nov. 2014, Renewable and Sustainable Energy Reviews 45 (2015) 785-807. (Year: 2014).*

Hawkes et al., "Modelling high level system design and unit commitment for a microgrid", Feb. 2008, Applied Energy 86 (2009) 1253-1265. (Year: 2008).*

Erhard, L., "The Effects of Battery Storage on Risk and Cost of Capital of Wind Park Investments", Jun. 2018, Junior Management Science 3 (3) (2018) 74-105. (Year: 2018).*

Goodrich et al., "Residential, Commercial, and Utility-Scale Photovoltaic (PV) System Prices in the United States: Current Drivers and Cost-Reduction Opportunities", Feb. 2012, NREL, Natl. Dept. of Energy, Technical Report NREL/TP-6A20-53347. (Year: 2012).*

Mansini, Ogryczak, and Speranza, Twenty Years of Linear Programming Based Portfolio Optimization, European Journal of Operational Research, Apr. 16, 2014, pp. 518-535, vol. 234, issue 2, Elsevier B.V., published online at dx.doi.org/10.1016/j.ejor.2013.08.035.

Qiu, Dong, Meng, Zheng, Chen, and Tian, Risk Sharing Strategy for Minimizing Imbalance Costs of Wind Power Forecast Errors, IEEE Power & Energy Society General Meeting, Jul. 2013, pp. 1-5, IEEE, Vancouver, BC, CA.

* cited by examiner

RENEWABLE ENERGY SYSTEM CONTROLS

CROSS-REFERENCE TO RELATED APPLICATIONS

This utility patent application claims priority from U.S. provisional patent application Ser. No. 62/857,421, filed Jun. 5, 2019, titled "Renewable Energy System Controls", and naming inventors Aly Eldeen O. Eltayeb, Benjamin Michael Jenkins, and Marco Ferrara. This utility patent is also related to co-pending U.S. patent application Ser. No. 16/892,942, titled "Systems And Methods For Managing A Renewable Power Asset", naming inventors Benjamin Michael Jenkins, Aly Eldeen O. Eltayeb, and Marco Ferrara, and filed Jun. 4, 2020.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2020, Form Energy Inc.

BACKGROUND

Field of Technology

This relates to power generation assets, and more specifically to hedging operations of power generation assets based on risk and return optimization strategies.

Background

Renewable power sources are becoming more prevalent and cost effective. However, many of those renewable power sources face intermittency problems. For example, solar generators depend on sunlight, and wind generators depend on wind speed and air density. Although renewable production is largely predictable over time, the intermittent generation creates situations where at times more power may be generated than is demanded, while at other times there is too little production that make investment in existing and/or new renewable energy systems less attractive to investors. In addition, competitive energy market environments expose renewable production to price uncertainties, making it difficult to ensure predictable revenues and therefore justify building a new renewable generation facility, or the expansion of an existing generation facility. The problem is exacerbated by the integration of ever increasing amounts of renewable generation in the necessary march to decarbonize our energy systems and may reach a point where the build out of new renewable generation is hindered and the ultimate goal of decarbonization is unachieved.

DESCRIPTION OF PRIOR ART

"Twenty years of linear programming based portfolio optimization" from authors Renata Mansini, Wlodzimierz Ogryczak, and M. Grazia Speranza, published Apr. 16, 2014 in European Journal of Operational Research Volume 234, Issue 2, pages 518-535 discloses, in the Abstract, "Markowitz formulated the portfolio optimization problem through two criteria: the expected return and the risk, as a measure of the variability of the return. The classical Markowitz model uses the variance as the risk measure and is a quadratic programming problem. Many attempts have been made to linearize the portfolio optimization problem. Several different risk measures have been proposed which are computationally attractive as (for discrete random variables) they give rise to linear programming (LP) problems. About twenty years ago, the mean absolute deviation (MAD) model drew a lot of attention resulting in much research and speeding up development of other LP models. Further, the LP models based on the conditional value at risk (CVaR) have a great impact on new developments in portfolio optimization during the first decade of the 21st century. The LP solvability may become relevant for real-life decisions when portfolios have to meet side constraints and take into account transaction costs or when large size instances have to be solved. In this paper we review the variety of LP solvable portfolio optimization models presented in the literature, the real features that have been modeled and the solution approaches to the resulting models, in most of the cases mixed integer linear programming (MILP) models. We also discuss the impact of the inclusion of the real features."

None of the above provides 1) systems to support the optimized design and operation of renewable power generation and transmission, 2) with hedging to offset renewable intermittency and market risks, 3) within a rigorous framework that precisely accounts for investor or operator risk and return preferences, 4) through linear programming computable optimizations. What is needed, therefore, is a solution that overcomes the above-mentioned limitations and that includes the features enumerated above.

BRIEF SUMMARY

Systems and methods introduce physical and/or financial instruments to optimally hedge the cash flow of one or more renewable energy generators to a desired risk and return profile of renewable infrastructure investors. A processor of a computing device may receive at least one forward-looking electricity market price scenario corresponding to each of one or more qualified market products intended for sale from the one or more renewable energy generators. Baseline revenues may be determined for each qualified market product from the corresponding forward-looking electricity market price scenarios. Risk and return metrics of cash flows of the renewable energy generator may be determined. At least one physical hedge and/or financial hedge may be added. The size and operation of the renewable energy generators along with any physical hedges, or financial hedges, or both physical and financial hedges, may be optimized across multiple market price scenarios of qualified market products to optimize investor-tailored risk and return utility functions.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

Figure 1A:
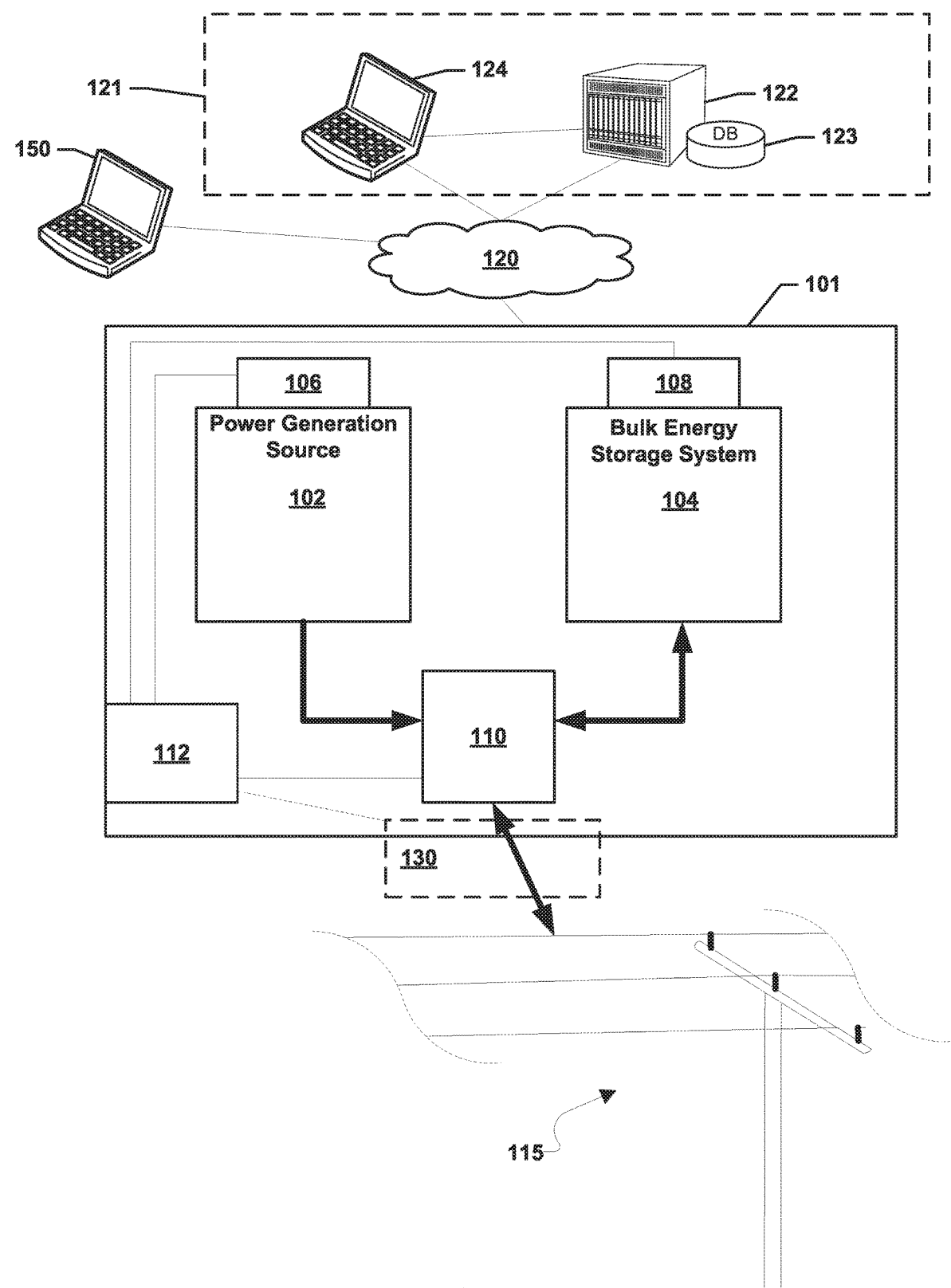
FIG. 1A is a system block diagram of a combined power generation, transmission and storage system combined in a single facility.

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current invention. Where there is a conflict, the following definitions apply.

A "computing device" refers to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, controllers, and similar electronic devices which include a programmable processor, memory, and circuitry configured to perform operations as described herein.

A "server" refers to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

A processor refers to a general purpose processor, a digital signal processor (DSP), an application specific integrated circuit (ASIC), a field programmable gate array (FPGA) or other programmable logic device, discrete gate or transistor logic, discrete hardware components, or any combination thereof, within a computing device. A general-purpose processor may be a microprocessor, but, in the alternative, may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A computer network refers to a 3G network, 4G network, 5G network, local area network, wide area network, core network, the Internet, or any combinations thereof.

A "renewable power asset" includes one or more renewable power generation assets and zero or more energy storage assets. A "renewable power asset" may also be referred to as a "node".

A "power generation system" includes one or more power generation sources and zero or more energy storage assets. The power generation sources may be renewable power generation assets or traditional non-renewable generation assets such as gas, coal, or nuclear. A power generation system may also be referred to as a "node".

A renewable power generation asset is a power generator using a renewable resource, such as, but not limited to, wind, solar, hydro, biomass, ocean thermal, and geothermal generators.

A combined power generation, transmission, and storage system includes a power generation system with one or more energy storage assets, and one or more transmission facilities.

An Energy Storage asset is equivalent to a bulk energy storage system.

A bulk energy storage system is a short duration energy storage (SDES) or long duration energy storage (LODES), and may include one or more batteries.

A Day Ahead Energy Market lets participants (energy generators and load serving entities) commit to buy or sell electricity one day before the operating day. The price committed is the Day Ahead (DA) price.

A Real Time Energy Market lets participants (energy generators and load serving entities) buy and sell electricity during the course of an operating day, and balances differences between Day Ahead commitments and actual real-time demand. The price exchanged within the Real Time Energy Market is the Real Time (RT) price.

In a regulated environment, also referred to as a regulated energy market, one entity owns and operates production, infrastructure, and delivery of electricity. Electricity pricing rates are set by public commissions and not a competitive market.

An Operating Strategy is a mathematical/algorithmic framework for a renewable power asset.

An Operating Schedule is an actual power output schedule for a renewable power asset; i.e., when to ramp-up, generate, and ramp-down for a generator; when to charge and when to output for a storage asset; when to transmit for a transmission asset.

"Prediction" and "forecast" are used interchangeably herein.

As used herein, the term "received" refers to information being acquired, obtained, or otherwise received, whether in response to a request for such information (i.e., initiated locally) or whether such information was sent from a remote computing device unsolicited (i.e., initiated remotely).

A physical hedge is an energy storage system capable of charging (receiving power for storing) and discharging (outputting previously stored power). A physical hedge may be one or more long-duration energy storage systems (LODES), or one or more short-duration energy storage systems (SDES), or both one or more LODES and one or more SDES. A physical hedge has attributes of maximum rated power, maximum rated stored energy, round-trip efficiency, self-discharge, ramp-rate, response time, calendar and throughput degradation.

A financial hedge is a contractually binding agreement applying to future financial aspects of revenues, volumes, or prices of energy produced by a renewable generator. A financial hedge may be any of a fixed for floating revenue swap, a fixed for floating renewable volume swap, a fixed for floating price swap, or any equivalent fixed for floating swap. A financial hedge may have attributes of fixed revenues, fixed volumes, fixed prices, upper and lower bounds (collars), and financial hedge premiums. A financial hedge may also comprise time-of-delivery variations, such as seasonal variation and/or peak/off-peak hour variations, to any of volume swaps, price swaps, and revenue swaps. A financial hedge can be sized, bought, and sold with financial intermediaries A market product is any of the services that may be provided by a combined power generation, transmission, and storage system. These include electrical energy, ancillary services, and capacity as a firm and dependable generation when required.

Ancillary services are services and functions of an electric grid which facilitate and support continuous flow of electric power originating from generators and reaching consumers such that energy supply continually meets energy demand. Ancillary services include frequency control, frequency regulation, spinning reserves, non-spinning reserves, black-start, voltage control, and other equivalents.

A qualified market product is a market product from a system which has shown it is capable of providing that market product.

The following variables and operations are defined as used throughout the description. Bold notation indicates vector variables that span an optimization time horizon.

$T$ is defined to be a transpose operation.

• is defined to be a scalar product operation.

J is defined to be a number of discretized time steps in optimization horizon, indexed by $1 \leq j \leq J$.

M is defined to be the number of possible renewable generation scenarios, indexed by $1 \leq m \leq M$.

K is defined to be the number of possible RT price scenarios, indexed by $1 \leq k \leq K$.

T is defined to be the number of total scenario permutations in given optimization, indexed by $1 \leq t \leq T$.

$q_{DA}$ is defined to be the DA commitments.

$q_X$ is defined to be the RT curtailment of renewable generation.

$q_{RT}$ is defined to be the RT renewable generation.

$g_{RT,m}$ is defined to be the renewable generation forecast in the $m^{th}$ scenario.

$p_{RT}$ is defined to be a RT price.

$p_{RT,k}$ is defined to be the RT price forecast in the $k^{th}$ scenario.

$(q_{RT,m} - q_{DA} - q_X)$ is defined to be the deviation from DA commitments.

$\delta_{RT,n,m,k}$ is defined to be the RT penalties, which is a function of deviation from DA commitments and market prices. For example, penalties may be a multiplier of the absolute value of the deviation from DA commitments.

$\gamma_m$ is defined to be a factor to bias optimization towards specific generation forecast scenarios.

$\lambda$ is defined to be a risk tolerance factor (with 0 being no risk aversion).

$\widetilde{w_{m,k}}$ is defined to be the Joint probability of $(q_{RT} = q_{RT,m}; p_{RT} = p_{RT,k})$ given a realized DA price.

$d_{RT}$ is defined to be the RT optimal discharge schedule of a storage system.

$c_{RT}$ is defined to be the RT optimal charge schedule of a storage system.

SOC is defined to be the State of charge of storage system.

$(q_{RT,m} + d_{RT} - c_{RT} - q_{DA} - q_X)$ is defined to be the deviation from DA commitments, including energy storage.

$P_{ESS}$ is defined to be storage rated power.

$c_p$ is defined to be storage unit power cost amortized in the optimization horizon.

$E_{ESS}$ is define to be storage rated energy.

$c_E$ is defined to be storage unit energy cost amortized in the optimization horizon.

$q_H$ is defined to be a baseline hedge volume shape.

$p_H$ is defined to be a baseline hedge price shape.

$q_{H,s,\tau}$ is defined to be a hedge volume shape perturbation in season s, time block $\tau$; 0 otherwise.

$p_{H,s,\tau}$ is defined to be a hedge price shape perturbation in season s, time block $\tau$; 0 otherwise.

$\alpha_{s,\tau}$ is defined to be a multiplier of the hedge volume shape perturbation in season s, time block $\tau$.

$\delta_{s,\tau}$ is defined to be a multiplier of the hedge price shape perturbation in season s, time block $\tau$.

Operation

Systems, methods, and devices may enable planning, design, development, control, and ongoing maintenance of one or more renewable energy systems, including power generation, transmission, and/or storage systems, with or without long term financial contracts, to meet an optimized size and operational strategy.

Referring to FIG. 1A, in the preferred embodiment power generation system 101 may include a combined power generation, transmission, and storage system, such as a power plant including one or more power generation sources 102 and one or more bulk energy storage systems 104. Power generation sources 102 may be preferably renewable power generation sources, but may also be non-renewable power generations sources, or combinations of renewable and non-renewable power generation sources. Some examples include wind generators, solar generators, geothermal generators, and nuclear generators. Bulk energy storage systems 104 may be short duration energy storage (SDES), LODES systems, or a combination of both, and may include one or more batteries. Some examples include rechargeable secondary batteries, refuellable primary batteries, and combinations of primary and secondary batteries. Battery chemistries may be any suitable chemistry, such as, but not limited to, lithium-ion based chemistries LFP, NMC, NMA, NCO, and/or Al, $AlCl_3$, Fe, $FeO_x(OH)_y$, $Na_xS_y$, $SiO_x(OH)_y$, $AlO_x(OH)_y$. Operation of power generation sources 102 may be controlled by one or more control systems 106. Control systems 106 may include motors, pumps, fans, switches, relays, or any other type devices that may serve to control the generation of electricity by power generation sources 102. Operation of bulk energy storage systems 104 may be controlled by one or more control systems 108. Control systems 108 may include motors, pumps, fans, switches, relays, or any other type devices that may serve to control the discharge and/or storage of electricity by the bulk energy storage systems. Control systems 106 and 108 may both be connected to plant controller 112. Plant controller 112 may monitor the overall operation of power generation system 101 and generate and send control signals to control systems 106 and 108 to control the operations of power generation sources 102 and bulk energy storage systems 104.

In power generation system 101, power generation sources 102 and bulk energy storage systems 104 may both be connected to one or more power control devices 110. Power control devices 110 may be connected to power grid 115 or other transmission infrastructure. Power control devices 110 may include switches, converters, inverters, relays, power electronics, and any other type devices that may serve to control the flow of electricity from, to, or between one or more of power generation sources 102, bulk energy storage systems 104, and power grid 115. Additionally, power generation system 101 may include transmission facilities 130 connecting power generation system 101 to power grid 115. As an example, transmission facilities 130 may connect between power control devices 110 and power grid 115 to enable electricity to flow between power generation system 101 and power grid 115. Transmission facilities 130 may include transmission lines, switches, relays, transformers, and any other type devices that may serve to support the flow of electricity between power generation system 101 and power grid 115. Power control devices 110 and/or transmission facilities 130 may be connected to plant controller 112. Plant controller 112 may be a computing device which may monitor and control the operations of power control devices 110 and/or transmission facilities 130, such as via various control signals. Plant controller 112 may control power control devices 110 and/or transmission facilities 130 to provide electricity from power generation sources 102 to power grid 115 and/or to bulk energy storage systems 104, to provide electricity from bulk energy storage systems 104 to power grid 115, and/or to provide electricity from power grid 115 to bulk energy storage systems 104. Power generation source 102 may selectively charge bulk energy storage system 104 and bulk energy storage system 104 may selectively discharge to the power grid 115. In this manner, energy (e.g., renewable energy, non-renewable energy, etc.) generated by power generation source 102 may be output to power grid 115 sometime after generation through bulk energy storage system 104.

Power generation sources 102 and the bulk energy storage systems 104 may be located together or geographically separated from one another. For example, bulk energy storage system 104 may be upstream of a transmission constraint, such as co-located with power generation source 102, upstream of a portion of grid 115. In this manner, over build of underutilized transmission infrastructure may be avoided by situating bulk energy storage system 104 upstream of a transmission constraint, charging bulk energy storage system 104 at times of transmission shortage and discharging bulk energy storage system 104 at times of available capacity. Bulk energy storage system 104 may also arbitrate electricity according to prevailing market prices to increase the revenues to power generation source 102. In another example, bulk energy storage system 104 may be downstream of a transmission constraint, such as downstream of a portion of grid 115, from power generation source 102. In this manner, over build of underutilized transmission infrastructure may be avoided by situating bulk energy storage system 104 downstream of a transmission constraint, charging bulk energy storage system 104 at times of available capacity and discharging bulk energy storage system 104 at times of transmission shortage. Bulk energy storage system 104 may also arbitrate electricity according to prevailing market prices to reduce the final cost of electricity to consumers.

Figure 1B:
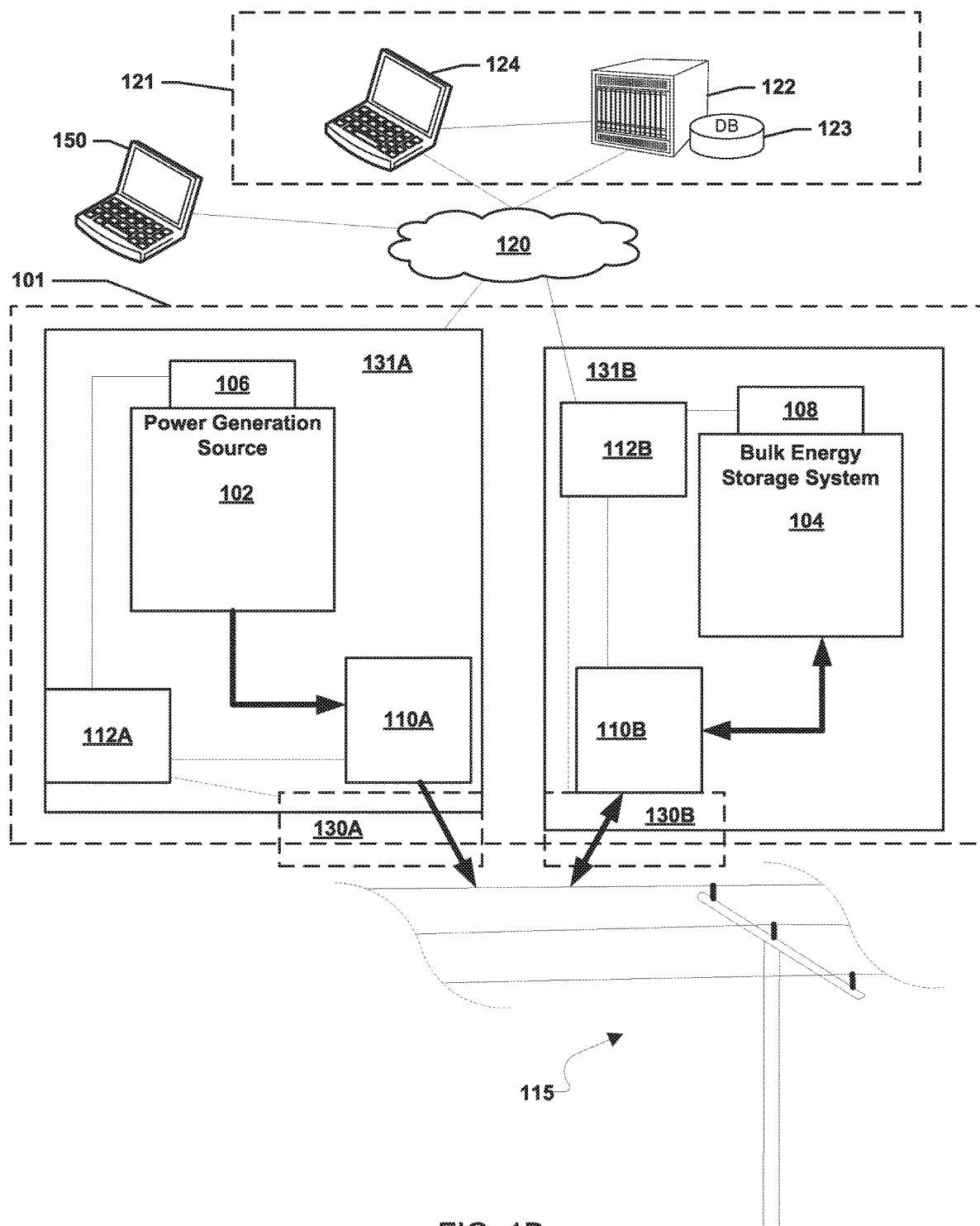
FIG. 1B is a system block diagram of an alternate combined power generation, transmission and storage system split across multiple facilities.

Referring also to FIG. 1B, in an alternate embodiment power generation sources 102 and bulk energy storage systems 104 may be separated from one another. Power generation sources 102 and bulk energy storage systems 104 may be separated in different plants 131A and 131B, respectively. Plants 131A and 131B may be co-located or may be geographically separated from one another. Plants 131A and 131B may connect to power grid 115 at different places. For example, plant 131A may connect to grid 15 upstream of where plant 131B connects. Plant 131A may include its own respective plant controller 112A, power control devices 110A, and/or transmission facilities 130A. Power control devices 110A and/or transmission facilities 130A may be connected to plant controller 112A. Plant controller 112A may monitor and control operations of power control devices 110A and/or transmission facilities 130A, such as via various control signals. Plant controller 112A may control power control devices 110A and/or transmission facilities 130A to provide electricity from power generation sources 102 to power grid 115. Plant 131B associated with bulk energy storage systems 104 may include its own respective plant controller 112B, power control devices 110B, and/or transmission facilities 130B. Power control devices 110B and/or transmission facilities 130B may be connected to plant controller 112B. Plant controller 112B may monitor and control the operations of power control devices 110B and/or transmission facilities 130B, such as via various control signals. Plant controller 112B may control the power control devices 110B and/or transmission facilities 130B to provide electricity from bulk energy storage systems 104 to power grid 115 and/or from grid 115 to bulk energy storage systems 104. Respective plant controllers 112A, 112B and respective transmission facilities 130A, 130B may be similar to plant controller 112 and transmission facilities 130 described with reference to FIG. 1A.

Figure 1C:
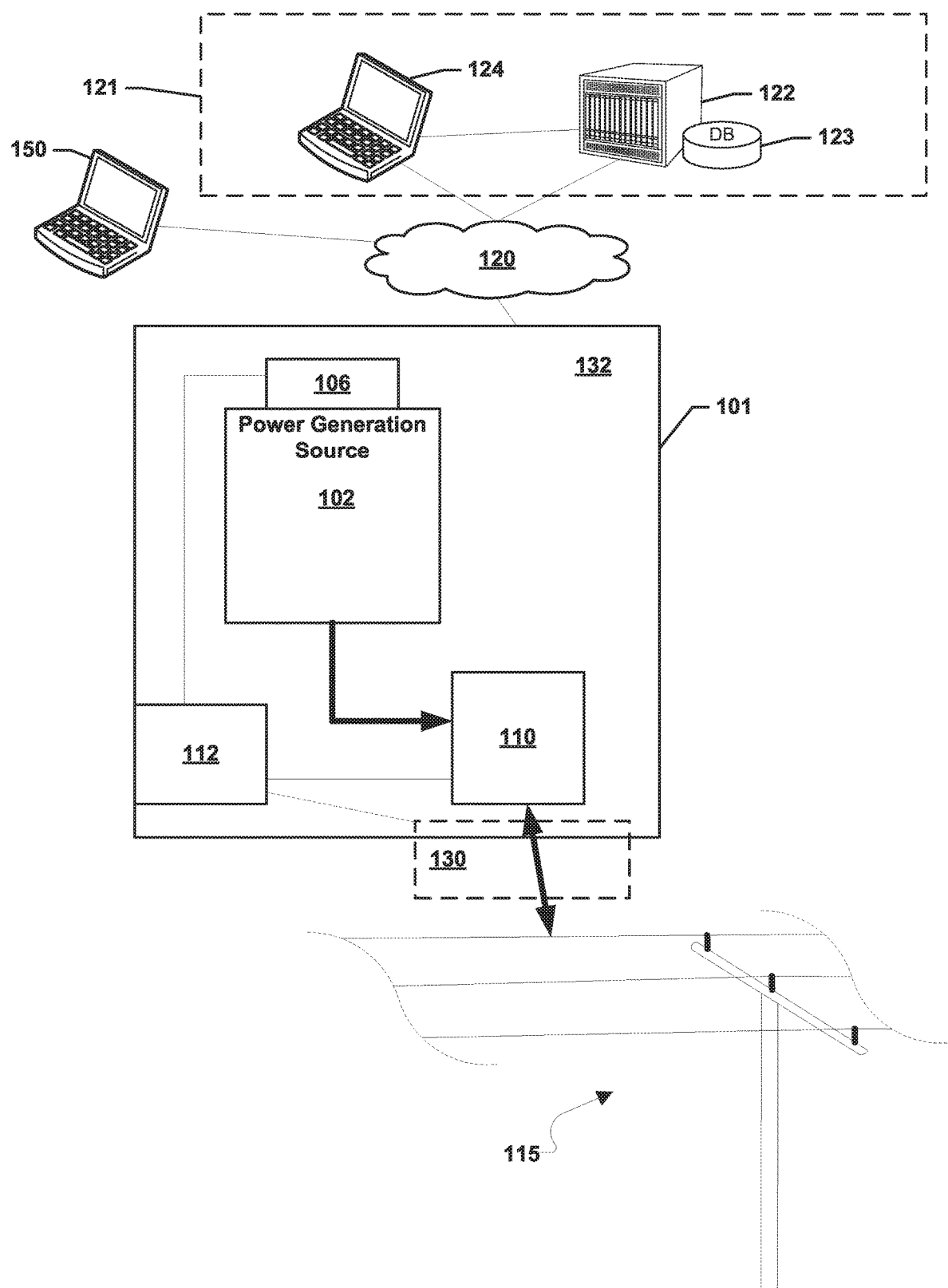
FIG. 1C is a system block diagram of an alternate power generation and transmission system.

Referring also to FIG. 1C, in an alternate embodiment power generation source 102 may be located in plant 132 that does not include a bulk energy storage system. Power generation system 101 and plant management system 121 may operate as described above with reference to FIG. 1A for monitoring and control of power generation and transmission from plant 132.

Plant controller 112, or plant controllers 112A and 112B, may be in communication with computer network 120. Using connections to network 120, plant controller 112 may exchange data with network 120 as well as devices connected to network 120, such as plant management system 121 or any other device connected to network 120. Plant management system 121 may include one or more computing devices, such as computing device 124 and server 122. Computing device 124 and server 122 may be connected to one another directly and/or via connections to network 120. The functionality of computing device 124 and server 122 may be combined into a single computing device, or may split among more than two devices. Additionally, the functionality may be in whole, or in part, offloaded to a remote computing device, such as a cloud-based computing system. While illustrated as in communication with a single power generation system 101, plant management system 121 may be in communication with multiple power generation systems.

Figure 2:
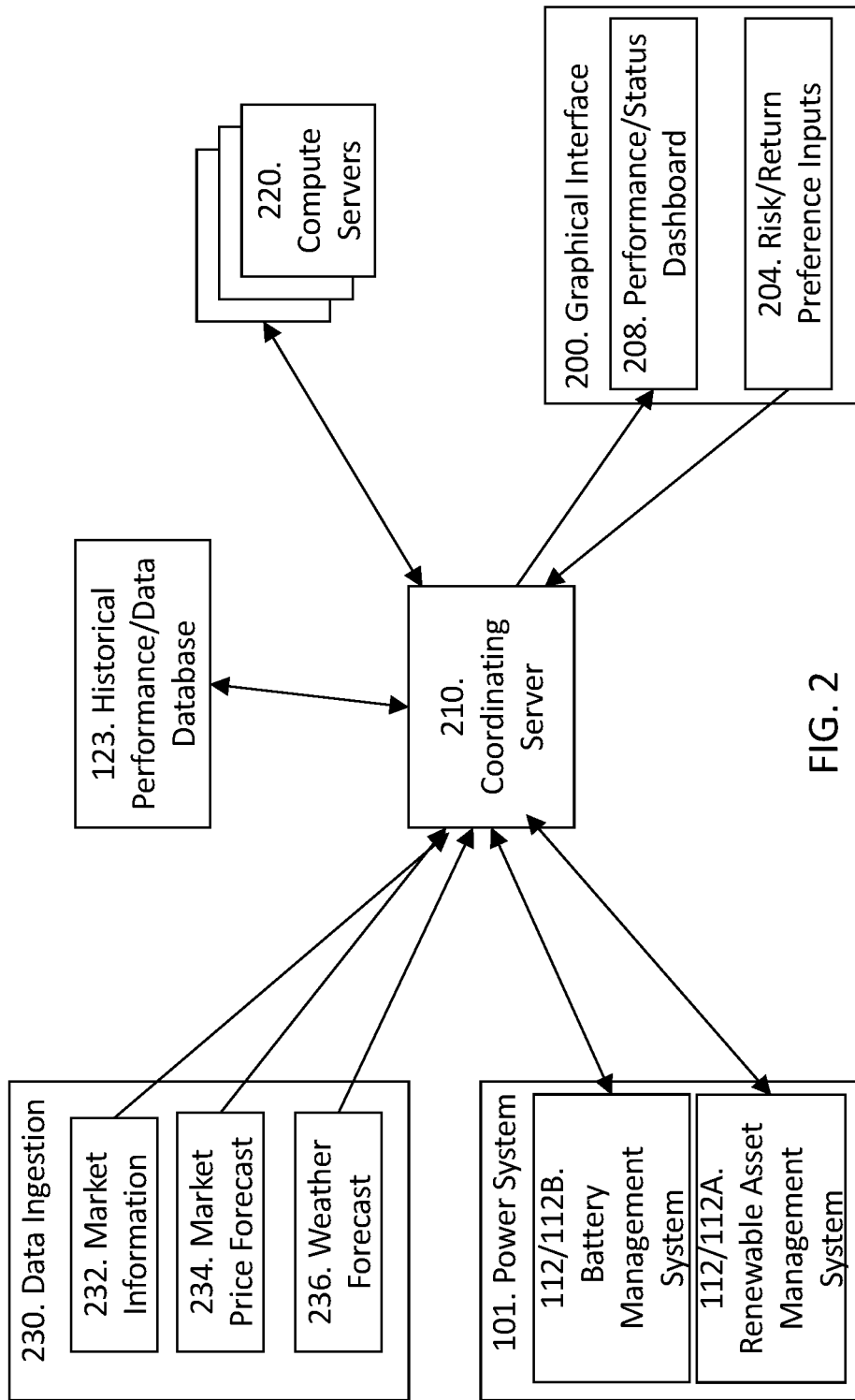
FIG. 2 is a system block diagram of computing servers and communications in a preferred embodiment.

Referring also to FIG. 2, computing device 124 of plant management system 121 may provide a user interface 200 enabling a user of plant management system 121 to define inputs 204 to plant management system 121 and/or power generation system 101, receive indications 208 associated with plant management system 121 and/or power generation system 101, and otherwise control the operation of plant management system 121 and/or power generation system 101. A user may utilize computing device 124 to define one or more capability attributes, one or more operating scenarios, one or more output goals, and one or more design and operating constraints. Computing device 124 may output various determined combined power generation, transmission, and storage system design specifications, operating schedules, and power delivery strategies to a user. Server 122 may be further divided into coordinating server 210 and various compute servers 220, which may be distributed across one or multiple computing devices, or implemented within a cloud computing environment. Server 122 of plant management system 121 may be configured to perform operations to receive one or more combined power generation, transmission, and storage system capability attributes, one or more operating scenarios, one or more combined power generation, transmission, and storage system output goals, and one or more design and operating constraints and determine a combined power generation, transmission, and storage system design specification, operating schedules, and power delivery strategies based at least in part on the received one or more capability attributes, the received one or more operating scenarios, the received system one or more output goals, and the received one or more design and operating constraints. Server 122 may have access to one or more databases 123 storing data associated with historical electrical generation, power generation capabilities, electrical generation forecast data, bulk energy storage capabilities, grid capabilities, historical electricity use patterns, historical electricity pricing information, power generation profiles, market conditions, storage specifications, project constraints, or any other type information that may be suitable for use by plant management system 121. Server 122 and/or computing device 124 may receive real-time data ingest 230 streams, such as, but not limited to, current electrical generation operations, current market conditions including market information 232 and market price forecasts 234, weather forecasts 236, or any other type information that may be suitable for use by plant management system 121. Power generation system 101 may be constructed or otherwise configured based on the design specifications determined by plant management system 121. The design specifications may indicate optimized parameters for one or more of power generation source 102, bulk energy storage system 104, and/or transmission facilities 130 to which power generation system 101 may be constructed or otherwise configured. Operation of plant controller 112, or plant controllers 112A and 112B, may be monitored by plant management system 121 and the operation of plant controller 112, or plant controllers 112A and 112B, and thereby power generation system 101, may be controlled by plant management system 121.

Plant management system 121 may interface with other computing devices connected to network 120, such as computing device 150. Using connections to network 120, plant management system 121 and computing device 150 may exchange data with one another. Alternatively, or additionally, computing device 150 may also directly connect to devices of plant management system 121. Plant management system 121 may provision one or more interfaces to other computing devices, such as computing device 150, enabling the other computing devices to interact with plant management system 121. As an example, plant management system 121 may provide a market interface enabling other computing devices, such as computing device 150, to be used to buy and/or sell shortfall and/or excess power generation of power generation system 101. The buying/selling of shortfall/excess may be controlled by plant management system 121 according to a cost strategy, such as a cost minimizing strategy, or a value strategy, such as a value maximizing strategy, that may inform operation of power generation system 101, especially bulk energy storage system 104. In this manner, bulk energy storage system 104 may be operated as a hedge against volatility of market prices. In other words, the ability of a market interface to sell and/or buy power generation capability through plant management system 121 may reduce the cost of supplying a load to consumers of the power from power generation system 101 or increase the market value of the power from power generation system 101 in a manner that optimizes the risk and return profile of the power generation system owner, operator, or investors.

Given the various configurations illustrated in FIGS. 1A, 1B, and 1C, when power generation source 102 includes renewable energy generation, there are risks due to intermittency of renewable generation. These risks include not being able to always meet immediate demand, and of generating at non-optimal times such that revenues are minimized and may be overburdened by operational costs. A bulk energy system may be used as a physical hedge, and contractual agreements may be financial hedges, which lessen the risk and maximize the financial and operational viability of the renewable power generation. Both a physical and a financial hedge may be optimized for size and operational strategy, in conjunction with renewable generation, and based on operator or investor risk-and-return utility functions. Sizing may be optimized at system design time for both size of the renewable generator and size of storage assets. Renewable generator and storage sizing may further be optimized any time when adding renewable generation and energy storage capacity to an existing system, or periodically to optimize how much of existing storage to utilize. Financial hedge sizing may be optimized any time when utilizing a financial hedge to offset financial and operational risk, including at time of initial system design and periodically thereafter for any new or existing generation system.

Figure 3:
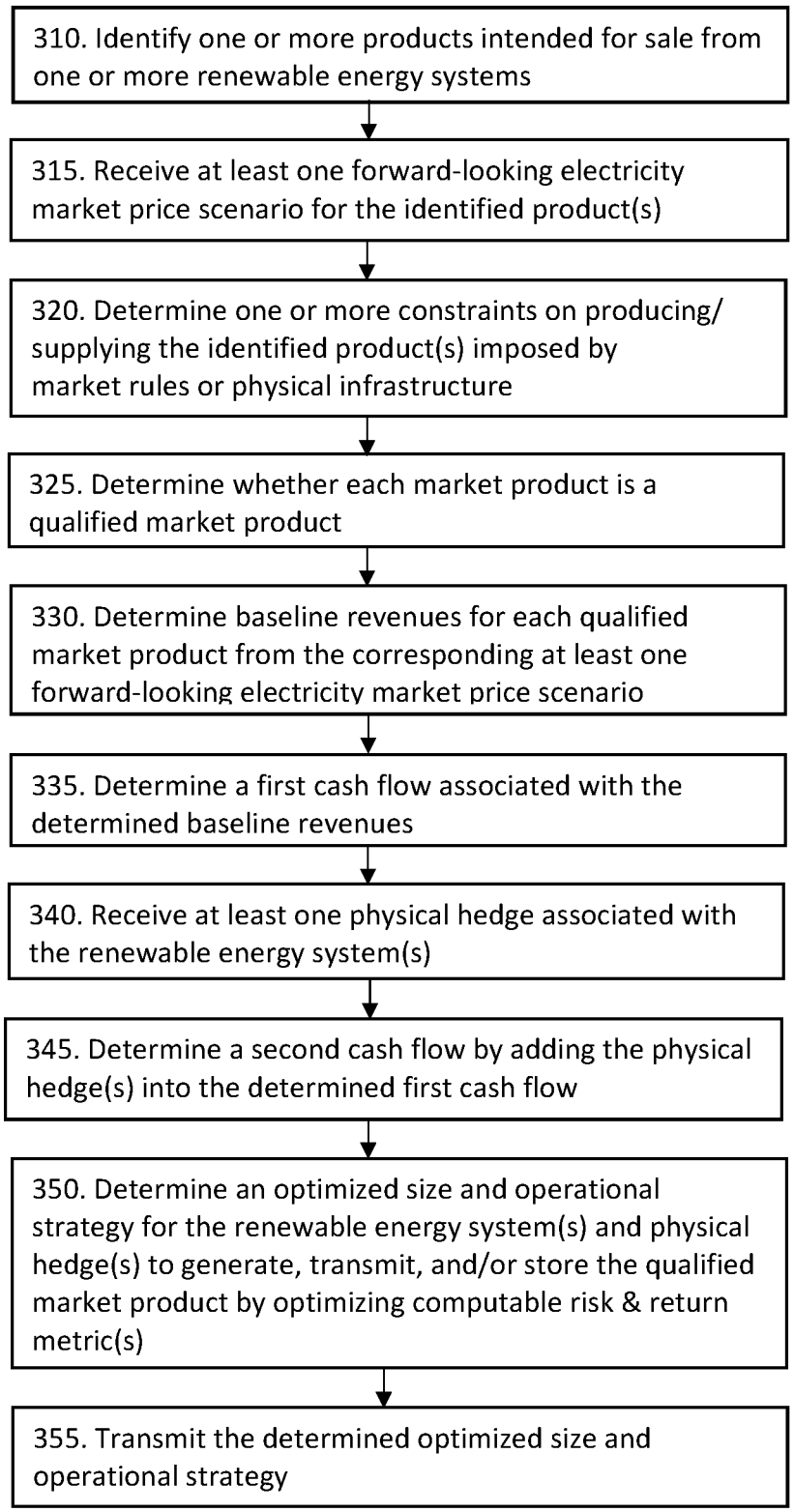
FIG. 3 is a process flow diagram illustrating a method for determining an optimized size and operational strategy of one or more renewable energy systems with associated physical hedge(s).

Referring also to FIG. 3, a processor of a computing device may determine the optimized size and operational strategy. The computing device may be part of or in communication with the plant management system, or a separate computing device for design of a plant to be built. The processor may identify 310 one or more market products intended for sale from the renewable energy system. The one or more market products intended for sale from the one or more renewable energy system may be selected by a user working on or with the computing device housing the processor.

The processor may receive 315 or acquire at least one forward-looking electricity market price scenario corresponding to each of the one or more identified market products intended for sale from the renewable energy system. Each forward-looking electricity market price scenario may be received from a vendor, a user-determined forecast, and/or any other source. Each forward-looking electricity market price scenario may be retrieved from a database, pre-loaded, input by a user, retrieved over a network, generated based on historical data, etc. Any forward-looking electricity market price scenario may be a Monte Carlo variation of best-guess baseline scenarios. The best-guess baseline scenarios may be determined based on historical patterns through techniques such as regression or machine learning. Additionally, or alternatively, the best-guess baseline scenarios may be determined based on fundamental analysis of cost-minimizing portfolios in future grids through techniques such as capacity expansion or production cost modeling simulations. The Monte Carlo variation may be generated based on correlated statistics calibrated with historical data. Additionally, or alternatively, the Monte Carlo variation may include known statistics of the underlying physical phenomena, such as renewable generator output, wind output, or solar output. Additionally, or alternatively, the Monte Carlo variation may include known statistics of the demand for electricity. Additionally, or alternatively, the Monte Carlo variation may include known statistics of the supply of electricity from a portfolio of generation and transmission assets.

Alternatively, the processor may calculate the forward-looking electricity market price scenarios as forecasts of Day Ahead and Real Time energy prices. The forecasts may be generated as detailed in related co-pending application Ser. No. 16/892,942, naming inventors Benjamin Michael Jenkins, Aly Eldeen O. Eltayeb, and Marco Ferrara, filed Jun. 4, 2020, titled "Systems And Methods For Managing A Renewable Power Asset", which is hereby fully incorporated by reference.

The processor may determine 320 or receive one or more constraints on producing and/or supplying the identified market products imposed by market rules or physical infrastructure.

The processor may determine 325 whether each market product is a qualified market product based on the forward-looking electricity market price scenarios and operational requirements modeled as mathematical constraints. If a market product falls within one or more of the constraints, it may be considered to be a qualified market product.

The processor may determine 330 baseline revenues for each qualified market product from one or more corresponding forward-looking electricity market price scenarios.

The processor may determine 335 a cash flow associated with the determined baseline revenues. The cash flow may have associated risk and return metrics. Risk metrics may include any of variance, standard deviation, downside spread from the median or mean value to an arbitrary downside value of the distribution of net present value, return on investment, and/or internal rate of return. Return metrics may include any of median or mean of the distribution of net present value, return on investment, and/or internal rate of return. LP computable risk and return metrics are detailed further below.

Specific computable risk and return metrics may vary depending on what type of hedge is used. The hedge may be one or more physical hedges, or one or more financial hedges, or a combination of one or more physical hedges and one or more financial hedges. Once hedges are identified, the determined cash flow may be updated to account for the hedge, and an optimized size and operational strategy determined using computable risk and return metrics.

The processor may receive 340 at least one physical hedge associated with the one or more renewable energy system. Any physical hedge may be received from a portfolio containing models, characteristics, structural specifications, and/or constraints of the at least one physical hedge, which may be stored in a database, pre-loaded, based on historical data, etc. Any physical hedge may be selected (i.e., identified) by a user working on or with the computing device housing the processor. Alternatively, any physical hedge may be identified from another source, such as a specification of a select renewable energy system. Each physical hedge may be a long-duration energy storage system (LODES) or a short-duration energy storage system (SDES) able to store and then provide electricity at various times. This enables shifting electricity from times of low market price to times of high market price, and providing electrical output in forms that conform with requirements of certain electrical products that are valuable when other electrical products are not. For example, a physical hedge may provide power output on demand to fulfill capacity obligations when renewable generation may suddenly and unexpectedly fall. Each physical hedge may have a maximum rated power, maximum rated stored energy, round-trip efficiency, self-discharge, ramp-rate, response time, calendar, and throughput degradation, as well as attributes of capital cost, operating cost, and decommissioning cost.

The processor may determine 345 a second cash flow by adding the received physical hedge(s) into the previously determined cash flow. The processor may optimize 350 size and operational strategy of the renewable power generator combined with the received physical hedge(s), across generation, transmission, and storage of qualified market product. Such optimization may be to maximize investor-tailored risk and return utility functions as detailed through mean-variance optimization in Equation 1.

$$\max_{q_X, d_{RT}, c_{RT}, P_{ESS}, E_{ESS}} \left\{ \mu_{\tilde{\vartheta}} - \lambda \left( \sum_{\substack{0 \leq m \leq M \\ 0 \leq k \leq K}} \widetilde{w_{m,k}} \gamma_m (\widetilde{\vartheta_{m,k}})^2 - \mu_{\tilde{\vartheta}}^2 \right) \right\} \quad \text{Equation 1}$$

Where:

$$\mu_{\tilde{\vartheta}} \stackrel{\text{def}}{=} \sum_{\substack{0 \leq m \leq M \\ 0 \leq k \leq K}} \widetilde{w_{m,k}} \gamma_m \widetilde{\vartheta_{m,k}}$$

$$\widetilde{\vartheta_{m,k}} \stackrel{\text{def}}{=} (q_{RT,m} + d_{RT} - c_{RT} - q_{DA} - q_X)^T \cdot p_{RT,k} -$$

$$\delta_{RT,m,k} - c_P P_{ESS} - c_E E_{ESS}$$

Subject to storage system discharge, charge, and state of charge constraints, which can be readily implemented as it will be apparent to those skilled in the art:

$$d_{RT,j} \leq P_{ESS} \forall j$$

$$c_{RT,j} \leq P_{ESS} \forall j$$

$$SOC_{j+1} = SOC_j - \frac{d_{RT,j}}{\eta_d} + \eta_c c_{RT,j} \forall j$$

$$0 \leq SOC_{j+1} \leq E_{ESS} \forall j$$

$$\eta_d \stackrel{\text{def}}{=} \text{Discharge efficiency}$$

$$\eta_c \stackrel{\text{def}}{=} \text{Charge efficiency}$$

An alternative formulation for maximizing investor-tailored risk and return utility functions, which is suited for a linear programming framework with LP computable utility functions, may ignore penalties:

$$\overline{\vartheta_{m,k}} = (q_{RT,m} + d_{RT} - c_{RT} - q_{DA} - q_X)^T \cdot p_{RT,k} -$$
$$c_P P_{ESS} - c_E E_{ESS} = d_{RT}^T \cdot p_{RT,k} - c_{RT}^T \cdot p_{RT,k} -$$
$$q_X^T \cdot p_{RT,k} - c_P P_{ESS} - c_E E_{ESS} + (q_{RT,m} - q_{DA})^T \cdot p_{RT,k}$$

Equation 2

Introduce the auxiliary optimization variable $$x \stackrel{\text{def}}{=} \begin{bmatrix} q_X \\ d_{RT} \\ c_{RT} \\ P_{ESS} \\ E_{ESS} \\ x_{3J+1} \end{bmatrix}$$

and the unit returns $$r_{m,k} \stackrel{\text{def}}{=} \begin{bmatrix} -p_{RT,k} \\ p_{RT,k} \\ -p_{RT,k} \\ -c_P \\ -c_E \\ (q_{RT,m} - q_{DA})^T \cdot p_{RT,k} \end{bmatrix} \quad \overline{\vartheta_{m,k}} = x^T \cdot r_{m,k}; \, x_{3J+1} = 1$$

Equation 3

Index scenarios to t and expand to components of $x$, $r_t$:

$$\tilde{\vartheta}_t = x^T \cdot r_t = \sum_{1 \le j \le 3J+1} x_j r_{j,t}; \, x_{3J+1} = 1$$

Equation 4

Introduce average return at a given time step (average across scenarios):

$$\mu_j \stackrel{\text{def}}{=} \sum_{1 \le t \le T} w_t r_{j,t}$$

Equation 5

Different optimizations may be applied based on the LP goal expressed in Equation 6.

$$\max_x \{\mu(x) - \lambda \rho(x)\}, \, \rho(x) \stackrel{\text{def}}{=} \text{Dispersion}$$

Equation 6

Equation 7 applies a mean absolute deviation (MAD), Equation 8 applies a minimax, Equation 9 applies a conditional value at risk (CVaR), Equation 10 applies a Gini mean difference (GMD), and Equation 11 applies a weighted conditional value at risk (WCVaR).

$$\max_{x,d^-} \left\{ \sum_j x_j \mu_j - \lambda \left( \sum_t d_t^- w_t \right) : d_t^- \ge \sum_j (\mu_j - r_{j,t}) x_j; \right.$$
$$\left. d_t^- \ge 0; \forall t = 1 \ldots T \right\}$$

Equation 7

$$\max_{x,v} \left\{ \sum_j x_j \mu_j - \lambda v : v \ge \sum_j (\mu_j - r_{j,t}) x_j; \forall t = 1 \ldots T \right\}$$

Equation 8

$$\max_{x,d^-,\eta} \left\{ \begin{array}{l} \sum_j x_j \mu_j - \lambda \left( \sum_j x_j \mu_j - \eta + \frac{1}{\beta} \sum_t d_t^- w_t \right) : \\ d_t^- \ge \eta - \sum_j r_{j,t} x_j; d_t^- \ge 0; \forall t = 1 \ldots T \end{array} \right\}$$

Equation 9

$\eta \stackrel{\text{def}}{=} \text{VaR at optimum}; \, \beta \stackrel{\text{def}}{=}$ probability of returns $\le$ VaR, $0 < \beta \le 1$ $$\max_{x,u} \left\{ \begin{array}{l} \sum_j x_j \mu_j - \lambda \left( \sum_j x_j \mu_j - \sum_{t,j} r_{j,t} x_j w_t^2 - 2 \sum_{\substack{1 \le t' \le T-1 \\ t'+1 \le t'' \le T}} u_{t',t''} w_{t'} w_{t''} \right) : \\ u_{t',t''} \le \sum_j r_{j,t'} x_j; u_{t',t''} \le \sum_j r_{j,t''} x_j; \\ \forall t' = 1 \ldots T-1; t'' = t'+1 \ldots T \end{array} \right\}$$

Equation 10

$$\max_{x,d^-} \left\{ \begin{array}{l} \sum_h \omega_h \left( \sum_j x_j \mu_j - \lambda \left( \sum_j x_j \mu_j - \eta_h + \frac{1}{\beta_h} \sum_t d_{h,t}^- w_t \right) \right) : \\ d_{h,t}^- \ge \eta_h - \sum_j r_{j,t} x_j; d_{h,t}^- \ge 0; \forall t = 1 \ldots T; \omega_h \in \text{weights} \end{array} \right\}$$

Equation 11

Alternatively, the optimization may be subject to a minimum return constraint as specified in Equation 12. Again, different optimizations may be applied, such as MAD (Equation 13), minimax (Equation 14), CVaR (Equation 15), GMD (Equation 16), or WCVaR (Equation 17).

$$\max_x \{\mu(x) - \rho(x) : \mu(x) \geq \mu_0\} \quad \text{Equation 12}$$

$$\max_{x,d^-} \left\{ \sum_j x_j \mu_j - \sum_t d_t^- w_t : d_t^- \geq \sum_j (\mu_j - r_{j,t}) x_j; \right.$$
$$\left. d_t^- \geq 0; \forall\, t = 1 \ldots T; \sum_j x_j \mu_j \geq \mu_0 \right\} \quad \text{Equation 13}$$

$$\max_{x,v} \left\{ \sum_j x_j \mu_j - v : v \geq \sum_j (\mu_j - r_{j,t}) x_j; \right.$$
$$\left. \forall\, t = 1 \ldots T; \sum_j x_j \mu_j \geq \mu_0 \right\} \quad \text{Equation 14}$$

$$\max_{x,d^-,\eta} \left\{ \eta - \frac{1}{\beta} \sum_t d_t^- w_t : d_t^- \geq \eta - \sum_j r_{j,t} x_j; \right.$$
$$\left. d_t^- \geq 0; \forall\, t = 1 \ldots T; \sum_j x_j \mu_j \geq \mu_0 \right\} \quad \text{Equation 15}$$

$$\max_{x,u} \left\{ \begin{array}{l} \left( \sum_{t,j} r_{j,t} x_j w_t^2 + 2 \sum_{\substack{1 \leq t' \leq T-1 \\ t'+1 \leq t'' \leq T}} u_{t',t''} w_{t'} w_{t''} \right) : \\ u_{t',t''} \leq \sum_j r_{j,t'} x_j; u_{t',t''} \leq \sum_j r_{j,t''} x_j; \\ \forall\, t' = 1 \ldots T-1; t'' = t'+1 \ldots T; \\ \sum_j x_j \mu_j \geq \mu_0 \end{array} \right\} \quad \text{Equation 16}$$

$$\max_{x,d^-} \left\{ \begin{array}{l} \sum_h \omega_h \left( \eta_h - \frac{1}{\beta_h} \sum_t d_{h,t}^- w_t \right) : \\ d_{h,t}^- \geq \eta_h - \sum_j r_{j,t} x_j; d_{h,t}^- \geq 0; \forall\, t = 1 \ldots T; \\ \omega_h \in \text{weights}; \sum_j x_j \mu_j \geq \mu_0 \end{array} \right\} \quad \text{Equation 17}$$

As another alternative, optimizations may be based on minimizing dispersion while subject to a minimum return constraint as specified in Equation 18. Again, different optimizations may be applied, such as MAD (Equation 19), minimax (Equation 20), CVaR (Equation 21), GMD (Equation 22), or WCVaR (Equation 23).

$$\min_x \{\rho(x) : \mu(x) \geq \mu_0\} \quad \text{Equation 18}$$

$$\max_{x,d^-} \left\{ \sum_t d_t^- w_t : d_t^- \geq \sum_j (\mu_j - r_{j,t}) x_j; \right.$$
$$\left. d_t^- \geq 0; \forall\, t = 1 \ldots T; \sum_j x_j \mu_j \geq \mu_0 \right\} \quad \text{Equation 19}$$

$$\max_{x,v} \left\{ v : v \geq \sum_j (\mu_j - r_{j,t}) x_j; \forall\, t = 1 \ldots T; \sum_j x_j \mu_j \geq \mu_0 \right\} \quad \text{Equation 20}$$

$$\max_{x,d^-,\eta} \left\{ \begin{array}{l} \sum_j x_j \mu_j - \eta + \frac{1}{\beta} \sum_t d_t^- w_t : \\ d_t^- \geq \eta - \sum_j r_{j,t} x_j; d_t^- \geq 0; \forall\, t = 1 \ldots T; \\ \sum_j x_j \mu_j \geq \mu_0 \end{array} \right\} \quad \text{Equation 21}$$

$$\max_{x,u} \left\{ \begin{array}{l} \left( \sum_j x_j \mu_j - \sum_{t,j} r_{j,t} x_j w_t^2 - 2 \sum_{\substack{1 \leq t' \leq T-1 \\ t'+1 \leq t'' \leq T}} u_{t',t''} w_{t'} w_{t''} \right) : \\ u_{t',t''} \leq \sum_j r_{j,t'} x_j; u_{t',t''} \leq \sum_j r_{j,t''} x_j; \\ \forall\, t' = 1 \ldots T-1; t'' = t'+1 \ldots T; \\ \sum_j x_j \mu_j \geq \mu_0 \end{array} \right\} \quad \text{Equation 22}$$

$$\min_{x,d^-} \left\{ \begin{array}{l} \sum_j x_j \mu_j = \sum_h \omega_h \left( \eta_h - \frac{1}{\beta_h} \sum_t d_{h,t}^- w_t \right) : \\ d_{h,t}^- \geq \eta_h - \sum_j r_{j,t} x_j; d_{h,t}^- \geq 0; \forall\, t = 1 \ldots T; \\ \omega_h \in \text{weights}; \sum_j x_j \mu_j \geq \mu_0 \end{array} \right\} \quad \text{Equation 23}$$

As another alternative, optimizations may be based relative to a no risk scenario as specified in Equation 24. Again, different optimizations may be applied, such as MAD (Equation 25), minimax (Equation 26), or CVaR (Equation 27).

$$\max_x \{(\mu(x) - r_0)/\rho(x)\}, r_0 \stackrel{\text{def}}{=} \text{risk free return} \quad \text{Equation 24}$$

$$\max_{\tilde{x},\tilde{d}^-,z} \left\{ \begin{array}{l} \sum_j \tilde{x}_j \mu_j - r_0 z : \sum_t \tilde{d}_t^- w_t = z; \tilde{d}_t^- \geq \sum_j (\mu_j - r_{j,t}) \tilde{x}_j; \\ \tilde{d}_t^- \geq 0; \forall\, t = 1 \ldots T; \sum_j \tilde{x}_j = z; \tilde{x}_j \geq 0 \end{array} \right\} \quad \text{Equation 25}$$
$$\Rightarrow x = \tilde{x}/z$$

$$\max_{\tilde{x},\tilde{v}} \left\{ \begin{array}{l} \sum_j \tilde{x}_j \mu_j - r_0 z : \\ \tilde{v} = z; \tilde{v} \geq \sum_j (\mu_j - r_{j,t}) \tilde{x}_j; \\ \forall\, t = 1 \ldots T; \sum_j \tilde{x}_j = z; \tilde{x}_j \geq 0 \end{array} \right\} \Rightarrow x = \tilde{x}/z \quad \text{Equation 26}$$

$$\max_{\tilde{x},\tilde{d}^-,\eta} \left\{ \sum_j \tilde{x}_j \mu_j - r_0 z : \sum_j \tilde{x}_j \mu_j - \eta + \frac{1}{\beta} \sum_t \tilde{d}_t^- w_t = z; \right.$$
$$\tilde{d}_t^- \geq \eta - \sum_j r_{j,t} \tilde{x}_j; \tilde{d}_t^- \geq 0; \forall\, t = 1 \ldots T;$$
$$\left. \sum_j \tilde{x}_j = z; \tilde{x}_j \geq 0 \right\} \Rightarrow x = \tilde{x}/z \quad \text{Equation 27}$$

Figure 4:
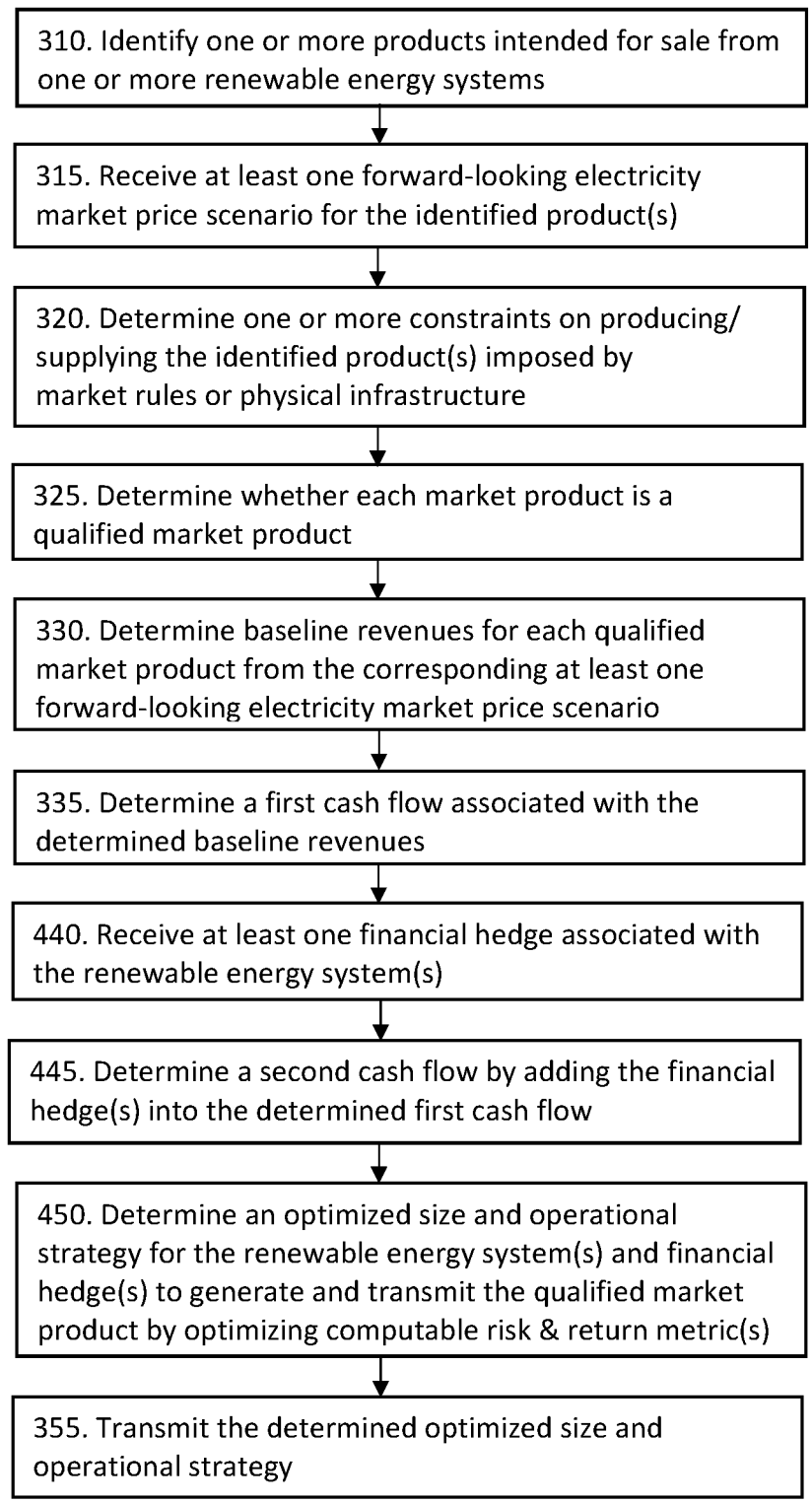
FIG. 4 is a process flow diagram illustrating a method for determining an optimized size and operational strategy of one or more renewable energy systems with associated financial hedge(s).

Referring also to FIG. 4, instead of a physical hedge the processor may receive 440 at least one financial hedge associated with the renewable energy system. Any financial hedge may be received from a portfolio containing models, characteristics, financial specifications, and/or constraints of the at least one financial hedge, which may be stored in a database, pre-loaded, based on historical data, etc. Any financial hedge may be selected (i.e., identified) by a user working on or with the computing device housing the processor. A financial hedge may be any of a fixed for floating revenue swap, a fixed for floating renewable volume swap, a fixed for floating price swap, or similar equivalents, applied in optimal amounts to the revenues, or components of revenues (volumes and prices) of the renewable power generator. Each financial hedge may include attributes of fixed revenues, fixed volumes, fixed prices, upper and lower bounds (collars), and financial hedge premiums that can be optimally sized and bought or sold with financial intermediaries. Any financial hedge may also comprise time-of-delivery variations, such as, but not limited to, seasonal and/or peak/off-peak hour variations to any of volume swaps, price swaps, and revenue swaps, and may be optimally sized and bought or sold with financial intermediaries.

The processor may determine 445 the second cash flow by adding the received financial hedge(s) into the previously determined cash flow. The processor may optimize 450 size and operational strategy of the renewable power generator combined with the received financial hedge(s), across generation and transmission of qualified market product. Such optimization may be to maximize investor-tailored risk and return utility functions as detailed through mean-variance optimization in Equations 28.

$$\max_{q_X, \alpha_{s,\tau}, \delta_{s,\tau}} \left\{ \mu_{\tilde{\vartheta}} - \lambda \left( \sum_{\substack{0 \le m \le M \\ 0 \le k \le K}} \widetilde{w_{m,k}} \gamma_m (\widetilde{\vartheta_{m,k}})^2 - \mu_{\tilde{\vartheta}}^2 \right) \right\} \quad \text{Equation 28}$$

where:

$$\mu_{\tilde{\vartheta}} \stackrel{\text{def}}{=} \sum_{\substack{0 \le m \le M \\ 0 \le k \le K}} \widetilde{w_{m,k}} \gamma_m \widetilde{\vartheta_{m,k}}$$

$$\widetilde{\vartheta_{m,k}} \stackrel{\text{def}}{=} (q_{RT,m} - q_{DA} - q_X)^T \cdot p_{RT,k} - \delta_{RT,m,k} -$$

$$q_H^T \cdot (p_{RT,k} - p_H) - \sum_{\substack{s \\ \tau}} \alpha_{s,\tau} q_{H,s,\tau}^T \cdot (p_{RT,k} - p_H) + \sum_{\substack{s \\ \tau}} \delta_{s,\tau} q_H^T \cdot p_{H,s,\tau}$$

An alternative formulation for maximizing investor-tailored risk and return utility functions, which is suited for a linear programming framework with LP computable utility functions, may ignore penalties:

$$\widetilde{\vartheta_{m,k}} = (q_{RT,m} - q_{DA} - q_X)^T \cdot p_{RT,k} - q_H^T \cdot (p_{RT,k} - p_H) - \quad \text{Equation 29}$$

$$\sum_{\substack{s \\ \tau}} \alpha_{s,\tau} q_{H,s,\tau}^T \cdot (p_{RT,k} - p_H) + \sum_{\substack{s \\ \tau}} \delta_{s,\tau} q_H^T \cdot p_{H,s,\tau}$$

By means of example, assume two seasons and two time blocks per day. Introduce the auxiliary optimization variable $$x \stackrel{\text{def}}{=} \begin{bmatrix} q_X \\ \alpha_{1,1} \\ \alpha_{1,2} \\ \alpha_{2,1} \\ \alpha_{2,2} \\ \delta_{1,1} \\ \delta_{1,2} \\ \delta_{2,1} \\ \delta_{2,2} \\ x_{J+9} \end{bmatrix}$$

and the unit returns $r_{m,k}$ $$\begin{bmatrix} -p_{RT,K} \\ -q_{H1,1}^T \cdot (p_{RT,k} - p_H) \\ -q_{H,1,2}^T \cdot (p_{RT,k} - p_H) \\ -q_{H,2,1}^T \cdot (p_{RT,k} - p_H) \\ -q_{H,2,2}^T \cdot (p_{RT,k} - p_H) \\ q_H^T \cdot p_{H,1,1} \\ q_H^T \cdot p_{H,1,2} \\ q_H^T \cdot p_{H,2,1} \\ q_H^T \cdot p_{H,2,2} \\ (q_{RT,m} - q_{DA})^T \cdot p_{RT,k} - q_H^T \cdot (p_{RT,k} - p_H) \end{bmatrix} \quad \widetilde{\vartheta_{m,k}} = x^T \cdot r_{m,k}; \quad \text{Equation 30}$$

$$x_{J+9} = 1$$

Index scenarios to t and expand to components of x, $r_t$:

$$\tilde{\vartheta}_t = x^T \cdot r_t = \sum_{1 \le j \le J+9} x_j r_{j,t}; \quad x_{J+9} = 1 \quad \text{Equation 31}$$

Introduce average return at a given time stamp (average across scenarios):

$$\mu_j \stackrel{\text{def}}{=} \sum_{1 \le t \le T} w_t r_{j,t} \quad \text{Equation 32}$$

With this formulation, the same MAD, minimax, CVaR, GMD, or WCVaR optimizations may be applied to the maximization or minimization goals and constraints as in Equations 6-27. Additionally, the hedge counter-party's cash flow $$r_{H,k} = q_{H^T} \cdot (p_{RT,k} - p_H) + \quad \text{Equation 33}$$

$$\sum_{\substack{s \\ \tau}} \alpha_{s,\tau} q_{H,s,\tau}^T \cdot (p_{RT,k} - p_H) - \sum_{\substack{s \\ \tau}} \delta_{s,\tau} q_{H^T} \cdot P_{H,s,\tau}$$

is required to meet risk and return expectations, which may be formulated as additional LP computable constraints, as will be apparent to those skilled in the art.

Figure 5:
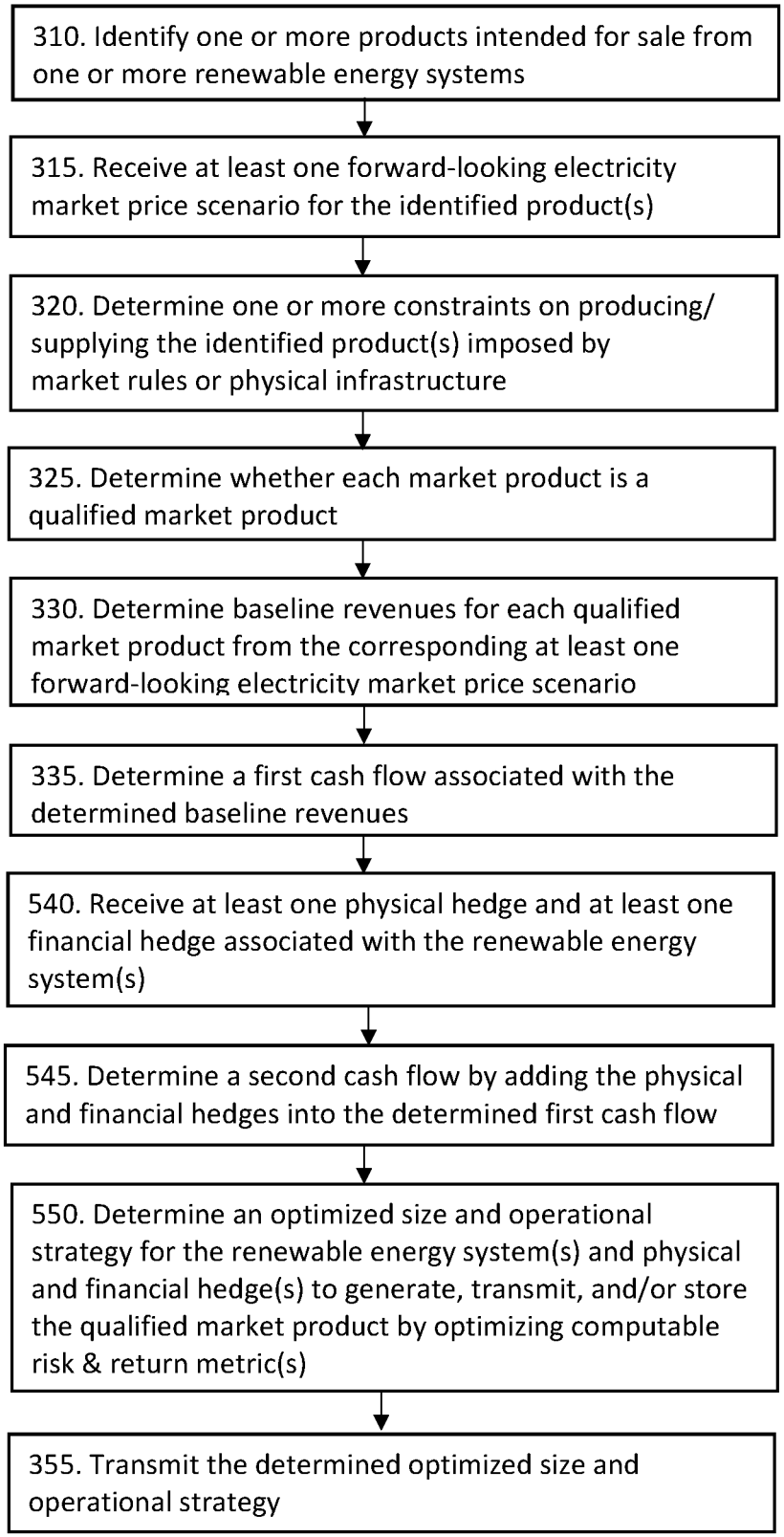
FIG. 5 is a process flow diagram illustrating a method for determining an optimized size and operational strategy of one or more renewable energy systems with associated physical and financial hedges.

Referring also to FIG. 5, the processor may receive 540 both at least one financial hedge and at least one physical hedge. The processor may determine 545 the second cash flow by adding the received financial and physical hedge(s) into the previously determined cash flow. The processor may optimize 550 size and operational strategy of the renewable power generator combined with the received financial and physical hedge(s), across generation and transmission of qualified market product. Such optimization may be to maximize investor-tailored risk and return utility functions as detailed through mean-variance optimization in Equation 34.

$$\max_{q_X, d_{RT}, c_{RT}, P_{ESS}, E_{ESS}, \alpha_{s,\tau}, \delta_{s,\tau}} \left\{ \mu_{\bar{\vartheta}} - \lambda \left( \sum_{\substack{0 \le m \le M \\ 0 \le k \le K}} \overline{w_{m,k}} \gamma_m (\overline{\vartheta_{m,k}})^2 - \mu_{\bar{\vartheta}}^2 \right) \right\}$$ Equation 34 where:

$$\mu_{\bar{\vartheta}} \stackrel{\text{def}}{=} \sum_{\substack{0 \le m \le M \\ 0 \le k \le K}} \overline{w_{m,k}} \gamma_m \overline{\vartheta_{m,k}}$$

$$\overline{\vartheta_{m,k}} \stackrel{\text{def}}{=} (q_{RT,m} + d_{RT} - c_{RT} - q_{DA} - q_X)^T \cdot p_{RT,k} -$$
$$\delta_{RT,m,k} - c_P P_{ESS} - c_E E_{ESS} - q_H^T \cdot (p_{RT,k} - p_H) -$$
$$\sum_{\substack{s \\ \tau}} \alpha_{s,\tau} q_{H,s,\tau}^T \cdot (p_{RT,k} - p_H) + \sum_{\substack{s \\ \tau}} \delta_{s,\tau} q_H^T \cdot p_{H,s,\tau}$$

Subject to storage system discharge, charge, and state of charge constraints, which can be readily implemented as it will be apparent to those skilled in the art:

$$d_{RT,j} \le P_{ESS} \forall j$$

$$c_{RT,j} \le P_{ESS} \forall j$$

$$SOC_{j+1} = SOC_j - \frac{d_{RT,j}}{\eta_d} + \eta_c c_{RT,j} \forall j$$

$$0 \le SOC_{j+1} \le E_{ESS} \forall j$$

$\eta_d \stackrel{\text{def}}{=}$ Discharge efficiency $\eta_c \stackrel{\text{def}}{=}$ Charge efficiency An alternative formulation for maximizing investor-tailored risk and return utility functions, which is suited for a linear programming framework with LP computable utility functions, may ignore penalties:

$$\overline{\vartheta_{m,k}} = (q_{RT,m} + d_{RT} - c_{RT} - q_{DA} - q_X)^T \cdot p_{RT,k} -$$ Equation 35
$$c_P P_{ESS} - c_E E_{ESS} - q_H^T \cdot (p_{RT,k} - p_H) -$$
$$\sum_{\substack{s \\ \tau}} \alpha_{s,\tau} q_{H,s,\tau}^T \cdot (p_{RT,k} - p_H) + \sum_{\substack{s \\ \tau}} \delta_{s,\tau} q_H^T \cdot p_{H,s,\tau}$$

By means of example, assume two seasons and two time blocks per day. Introduce the auxiliary optimization variable $$x \stackrel{\text{def}}{=} \begin{bmatrix} q_X \\ d_{RT} \\ c_{RT} \\ \alpha_{1,1} \\ \alpha_{1,2} \\ \alpha_{2,1} \\ \alpha_{2,2} \\ \delta_{1,1} \\ \delta_{1,2} \\ \delta_{2,1} \\ \delta_{2,2} \\ P_{ESS} \\ E_{ESS} \\ x_{3J+11} \end{bmatrix}$$

and the unit returns $r_{m,k}$ $$\begin{bmatrix} -p_{RT,k} \\ p_{RT,k} \\ -p_{RT,k} \\ -q_{H1,1}^T \cdot (p_{RT,k} - p_H) \\ -q_{H1,2}^T \cdot (p_{RT,k} - p_H) \\ -q_{H2,1}^T \cdot (p_{RT,k} - p_H) \\ -q_{H2,2}^T \cdot (p_{RT,k} - p_H) \\ q_H^T \cdot p_{H,1,1} \\ q_H^T \cdot p_{H,1,2} \\ q_H^T \cdot p_{H,2,1} \\ q_H^T \cdot p_{H,2,2} \\ -c_P \\ -c_E \\ (q_{RT,m} - q_{DA})^T \cdot p_{RT,k} - q_H^T \cdot (p_{RT,k} - p_H) \end{bmatrix} \vartheta_{m,k} = x^T \cdot r_{m,k};$$ Equation 36

$$x_{3J+11} = 1$$

Index scenarios to t and expand to components of x, $r_t$, add equality constraints:

$$\vartheta_t = x^T \cdot r_t = \sum_{1 \le j \le 3J+11} x_j r_{j,t}; x_{3J+11} = 1$$ Equation 37

Introduce average return at a given time stamp (average across scenarios):

$$\mu_j \stackrel{\text{def}}{=} \sum_{1 \le t \le T} w_t r_{j,t}$$ Equation 38

With this formulation, the same MAD, minimax, CVaR, GMD, or WCVaR optimizations may be applied to the maximization or minimization goals and constraints as in Equations 6-27. Additionally, the hedge counter-party's cash flow $$r_H = q_H^T \cdot (p_{RT,k} - p_H) + \sum_{\substack{s \\ \tau}} \alpha_{s,\tau} q_{H,s,\tau}^T \cdot (p_{RT,k} - p_H) - \sum_{\substack{s \\ \tau}} \delta_{s,\tau} q_H^T \cdot p_{H,s,\tau}$$

Equation 39 is required to meet risk and return expectations, which may be formulated as additional LP computable constraints, as will be apparent to those skilled in the art.

Should the physical or financial hedge already exist, the same optimizations may be performed as in Equations 1-4, and 28-33, or 34-39 while holding size of storage and/or parameters of financial hedges as fixed. Once optimized, any storage of the optimized size may be installed if not already present. Any optimally sized financial hedges may be automatically purchased through a financial transaction interface. Operational generation, transmission, and any storage may be directed by plant controller through operational schedules generated based on the optimized operational strategy.

The various optimization frameworks detailed above may be implemented individually for a specific system and owner, operator, or investor. For example, a specific optimization for financial hedging may be selected and implemented in software for an owner, operator, or investor of a renewable generation asset with no related storage. A different optimization may be implemented in software for an owner, operator, or investor of a renewable generation asset adding storage as a physical hedge. Thus the software, and operation of the processor, may be customized to each system, owner, and owner preferences. Alternatively, multiple optimization frameworks may be implemented in software. Owner, operator, or investor selection between different optimizations may be in advance through a user interface selection or configuration setting, or multiple optimizations may be run and then selected between for ongoing system operation.

Figure 6:
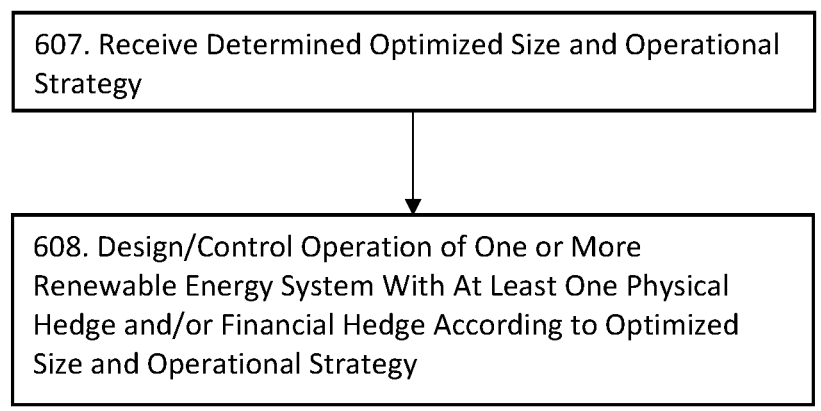
FIG. 6 is a process flow diagram illustrating a method for operating a renewable energy system.

With the optimized hedge sizing and operational strategy determined, they may be transmitted 355 for execution and operational control. Referring also to FIG. 6, the operations of a method for managing a renewable power asset may be performed by a processor of a control device, such as one or more computer processors of plant management system 121, of plant controller 112 or plant controllers 112A and 112B, of any computing device in communication with plant management system 121 or plant controller 112 or plant controllers 112A and 112B, or any combination of multiple processors thereof. The method may be executed through software instructions executed by the processor and stored on a non-transitory processor readable or computer readable medium. Alternatively, the functional steps of the method may be implemented in hardware or firmware executed by the processor. The processor receives 607 the determined optimized size and operational strategy based on the optimization frameworks discussed above. The determined optimized size and operational strategy may have been transmitted in various manners, including being determined by the plant management system itself, displayed at one or more terminals, and/or the communicated from a remote computing device.

The processor may control 608 the operation of one or more renewable energy generation systems along with a physical hedge, or a financial hedge, or both a physical and financial hedge, according to the determined optimized size and operational strategy. The processor may direct the operation of a combined power generation, transmission, and/or storage system according to an operational plan or control algorithm that may be part of the operational strategy. In this manner, the combined power generation, transmission, and/or storage system may be operated to achieve the output goals. As examples, the combined power generation, transmission, and/or storage system may be operated according to an operational plan or control algorithm to discharge and/or charge a bulk energy storage system, may be operated according to an operational plan or control algorithm to output electricity to the grid from the power generation source and/or the bulk energy storage system, may be operated according to an operational plan or control algorithm to sell excess capacity to an electricity market, and/or may be operated according to an operational plan or control algorithm to buy capacity from an electricity market. Additionally, and/or alternatively, the determined optimized size and operational strategy may be used to design all or part of the renewable generation system, such as to size various aspects of the combined power generation, transmission, and/or storage systems.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

What is claimed is:

1. A method to manage operation of a renewable power asset, comprising:
   operating a computing device controlling or in communication with one or more control devices of a renewable power asset;
   identifying, by the computing device, one or more market products to be sold by the renewable power asset;
   creating, by the computing device, forward looking market price scenarios representative of the one or more market products through Monte Carlo variations of best guess baseline scenarios determined based on historical patterns and statistics of underlying physical phenomena;
   calculating, by the computing device, baseline revenues of the renewable power asset in the forward-looking market price scenarios;
   determining, by the computing device, a first cash flow associated with the baseline revenues;
   determining, by the computing device, a second cash flow by adding at least one physical hedge and at least one financial hedge into the first cash flow, wherein each physical hedge comprises a long duration energy storage system or a short duration energy storage system, and each physical hedge has attributes of a maximum rated power, a maximum rated stored energy, a round-trip efficiency, a self-discharge, a ramp-rate, a response time, a calendar degradation, a throughput degradation, a capital cost, an operating cost, and a decommissioning cost, and wherein each financial hedge is any of a fixed for floating revenue swap, a fixed for floating renewable volume swap, or a fixed for floating price swap, applied in optimal amounts to revenues or components of revenues of the renewable power asset, and wherein each financial hedge has attributes of fixed revenues, fixed volumes, fixed prices, upper and lower bounds, and financial hedge premiums;
   optimizing, by the computing device, a size of the at least one hedge, a size of the at least one financial hedge, and an operational strategy of the renewable power asset through a linear programming framework based on utility functions of risk and return metrics;

transacting, by the computing device, exchange of the at least one financial hedge at the optimized size through a financial transaction interface; and controlling, by the computing device or the one or more control devices in communication with the computing device, the renewable power asset to generate and deliver power and the at least one physical hedge to charge and discharge based on the optimized operational strategy.

2. A method to manage operation of a renewable power asset, comprising:

operating one or more computing devices controlling or in communication with one or more control devices of a renewable power asset;

identifying, by the computing device, one or more market products to be sold by the renewable power asset;

generating, by the one or more computing devices, forward looking market price scenarios representative of the one or more market products;

calculating, by the one or more computing devices, baseline revenues of the renewable power asset in the forward looking market price scenarios;

determining, by the one or more computing devices, a first cash flow associated with the baseline revenues;

determining, by the one or more computing devices, a second cash flow by adding at least one hedge into the first cash flow;

optimizing, by the one or more computing devices, a size of the at least one hedge and an operational strategy of the renewable power asset; and controlling, by the one or more computing devices or the one or more control devices in communication with the computing device, the renewable power asset to generate and deliver power based on the optimized operational strategy.

3. The method of claim 2, wherein generating forward looking market price scenarios further comprises creating, by the one or more computing devices, the forward looking market price scenarios through Monte Carlo variations of best guess baseline scenarios determined based on historical patterns and statistics of underlying physical phenomena.

4. The method of claim 2, wherein adding at least one hedge further comprises adding at least one physical hedge.

5. The method of claim 4, wherein adding at least one physical hedge further comprises adding at least one physical hedge wherein each physical hedge comprises a long duration energy storage system or a short duration energy storage system, and each physical hedge has attributes of a maximum rated power, a maximum rated stored energy, a round-trip efficiency, a self-discharge, a ramp-rate, a response time, a calendar degradation, a throughput degradation, a capital cost, an operating cost, and a decommissioning cost.

6. The method of claim 5, further comprising sizing the at least one physical hedge at the optimized size, and charging and discharging the at least one physical hedge based on the optimized operational strategy.

7. The method of claim 6, wherein optimizing further comprises optimizing based on a mean-variance optimization of risk and return metrics.

8. The method of claim 7, further comprising holding the optimal size of a physical hedge as fixed at a size of an existing physical hedge associated with the renewable generator asset.

9. The method of claim 6, wherein optimizing further comprises optimizing through a linear programming framework based on utility functions of risk and return metrics.

10. The method of claim 9, further comprising holding the optimal size of a physical hedge as fixed at a size of an existing physical hedge associated with the renewable generator asset.

11. The method of claim 2, wherein adding at least one hedge further comprises adding at least one financial hedge.

12. The method of claim 11, wherein adding at least one financial hedge further comprises adding at least one financial hedge wherein each financial hedge is any of a fixed for floating revenue swap, a fixed for floating renewable volume swap, or a fixed for floating price swap, applied in optimal amounts to revenues or components of revenues of the renewable power asset, and wherein each financial hedge has attributes of fixed revenues, fixed volumes, fixed prices, upper and lower bounds, and financial hedge premiums.

13. The method of claim 12, further comprising transacting, by the one or more computing devices, exchange of the at least one financial hedge at the optimized size through a financial transaction interface.

14. The method of claim 13, wherein optimizing further comprises optimizing based on a mean-variance optimization of risk and return metrics.

15. The method of claim 13, wherein optimizing further comprises optimizing through a linear programming framework based on utility functions of risk and return metrics.

16. The method of claim 2, wherein adding at least one hedge further comprises adding at least one physical hedge and at least one financial hedge.

17. The method of claim 16, further comprising sizing the at least one physical hedge at the optimized size, and charging and discharging the at least one physical hedge based on the optimized operational strategy.

18. The method of claim 17, further comprising transacting, by the computing device, exchange of the at least one financial hedge at the optimized size through an energy market exchange interface.

19. The method of claim 18, wherein optimizing further comprises optimizing based on a mean-variance optimization of risk and return metrics.

20. The method of claim 19, further comprising holding the optimal size of a physical hedge as fixed at a size of an existing physical hedge associated with the renewable generator asset.

21. The method of claim 18, wherein optimizing further comprises optimizing through a linear programming framework based on utility functions of risk and return metrics.

22. The method of claim 21, further comprising holding the optimal size of a physical hedge as fixed at a size of an existing physical hedge associated with the renewable generator asset.

* * * * *